(12) United States Patent
Feng et al.

(10) Patent No.: US 7,318,897 B2
(45) Date of Patent: Jan. 15, 2008

(54) METHOD OF REMOVING SPECTATOR IONS FROM AQUEOUS SUSPENSION OF SOLID PARTICLES

(75) Inventors: Xiangdong Feng, Broadview Heights, OH (US); Christopher J. Szepesi, State College, PA (US); Heber E. Rast, III, The Woodlands, TX (US); Mike S. H. Chu, Lewiston, NY (US); James H. Adair, State College, PA (US)

(73) Assignees: Ferro Corporation, Cleveland, OH (US); The Penn State Research Foundation, University Park, PA (US)

( * ) Notice: Subject to any disclaimer, the term of this patent is extended or adjusted under 35 U.S.C. 154(b) by 497 days.

(21) Appl. No.: 10/917,829

(22) Filed: Aug. 13, 2004

(65) Prior Publication Data

US 2005/0095193 A1    May 5, 2005

Related U.S. Application Data

(60) Provisional application No. 60/495,594, filed on Aug. 14, 2003, provisional application No. 60/495,744, filed on Aug. 15, 2003.

(51) Int. Cl.
*B01D 11/02* (2006.01)
*C01G 23/00* (2006.01)
*C01F 11/00* (2006.01)

(52) U.S. Cl. .................. 210/639; 423/70; 423/71; 423/598; 423/636; 428/403

(58) Field of Classification Search .......... 210/634, 210/638, 639, 644, 684, 685, 774; 423/1, 423/21.5, 70, 71, 598, 635, 636, 403; 252/62.3 BT, 252/62.3 C, 62.3 V; 501/137
See application file for complete search history.

(56) References Cited

U.S. PATENT DOCUMENTS 2,758,911 A    8/1956    Lynd et al.
3,957,504 A    5/1976    Ho et al.
5,009,876 A    4/1991    Hennings et al.
5,783,165 A    7/1998    Wilson et al.
5,900,223 A    5/1999    Matijevic et al.
6,051,614 A    4/2000    Hirai et al.
7,094,289 B2 *    8/2006    Akimoto et al. ............. 117/91
2003/0133869 A1    7/2003    Hur et al.

FOREIGN PATENT DOCUMENTS

WO    WO 03/016219 A1    2/2003

OTHER PUBLICATIONS

Tartaj et al., "The preparation of magnetic nanoparticles for applications in biomedicine," J. Phys. D: Appl. Phys. 36 (2003) pp. R182-R197.
Ghosh et al., "A Novel Route to Toluene-Soluble Magnetic Oxide Nanoparticles: Aqueous . . . ," Chem. Mater. 2004, 16, pp. 118-124.
Lee et al., "Aqueous processing of barium titanate powders," Journal of Ceramic Processing Research, vol. 4, No. 1, pp. 17-24 (2003).
Kimel, R. Allen, et al., Double Injection Synthesis and Dispersion of Submicrometer Barium Titanyl Oxalate Tetrahydrate, J. Am. Ceram. Soc., 2001, pp. 1172-1174, vol. 84, issue 5.

* cited by examiner

*Primary Examiner*—Joseph Drodge
(74) *Attorney, Agent, or Firm*—Rankin, Hill, Porter & Clark LLP

(57) ABSTRACT

The present invention provides a method of removing spectator ions and contaminants from aqueous suspensions of solid particles. In accordance with the method of the invention, the solid particles are transported across a phase boundary into a non-polar organic solvent, leaving the spectator ions and contaminants in the aqueous phase. To facilitate the efficient transportation of the solid particles across the phase boundary, the surface of the solid particles is coated with an amphiphilic polyelectrolyte. If desired, the solid particles can be recovered from the organic phase by evaporating the organic solvent.

11 Claims, No Drawings

METHOD OF REMOVING SPECTATOR IONS FROM AQUEOUS SUSPENSION OF SOLID PARTICLES

This application claims priority to Provisional Application No. 60/495,594 filed Aug. 14, 2003 and Provisional Application No. 60/495,744 filed Aug. 15, 2003.

This patent application stems from a joint research agreement between Ferro Corporation, Cleveland, Ohio, and The Penn State Research Foundation, State College, Pennsylvania.

BACKGROUND OF THE INVENTION

1. Field of Invention

The present invention provides a method of removing spectator ions from aqueous suspensions of solid particles.

2. Description of Related Art

Barium titanate ($BaTiO_3$, hereinafter sometimes abbreviated as "BT") is one of the most widely used ceramic materials in the electronics industry, especially in the production of multilayer capacitors. Many techniques have been developed over the years to produce BT, but the most common technique for producing BT on an industrial scale is a wet chemical process known as the Clabaugh process.

In the Clabaugh process, aqueous barium chloride ($BaCl_2.2H_2O$) and titanium tetrachloride ($TiCl_4$) solutions are mixed with an aqueous solution of oxalic acid ($HOOCCOOH.2H_2O$) to produce barium titanyl oxalate tetrahydrate ($BaTiO(C_2O_4)_2.4H_2O$, hereinafter sometimes abbreviated as "BTO"). The reaction can be carried out a room temperature and atmospheric pressure. When calcined at 750° C., BTO decomposes to BT.

For many electronic applications, it is critical that the BT be stoichiometric. In other words, the ratio of barium atoms to titanium atoms in the BT must be very close to unity (Ba:Ti=1.0). To produce stoichiometric BT using the Clabaugh process, a 5% molar excess of barium chloride and a 20% molar excess of oxalic acid must be used to minimize competing reactions. The Clabaugh process is entirely aqueous, but the resulting BTO precipitate must be washed in order to remove chlorine and excess barium.

The use of the BTO as a BT precursor has many advantages over other processes to produce BT, such as high temperature solid state reactions between mixtures of oxides and hydrothermal techniques. BTO particle size, stoichiometry and secondary phases can be controlled and the material can be easily produced at room temperature and atmospheric pressure from a variety of relatively inexpensive materials. There are, however, some disadvantages to the wet chemical technique.

Depending on the method used, production of large quantities of BTO can be time consuming. Moreover, if the BTO particles are left in aqueous suspension for extended periods of time, agglomeration and particle growth (Ostwald ripening) can readily occur. If agglomerates are not removed before calcination, they may lead to the formation of hard aggregates that can compromise the packing efficiency of the final BT powder. Furthermore, the wet chemical process requires several washing steps to remove spectator ions, such as chloride, excess barium and/or nitrates, which could harm electronic properties in the final BT.

Recovery and washing of the BTO precipitate is normally the most expensive and time-consuming step in the BT production process. BTO particles may be recovered by centrifugation or filtration, but these techniques bring the BTO particles into close contact with one another, possibly causing irreversible aggregation. This can be prevented with the use of polymeric flocculants that separate particles through a steric mechanism. Depending on the material, these additives may be expensive and may introduce unwanted ions into the material.

One of the most common techniques for the recovery of BTO is displacement washing in which the aqueous BTO suspension is centrifuged, the supernatant decanted, and the BTO powder redispersed with fresh solution. Several repetitions of this washing process are normally required to remove the contaminants to an acceptable level. This is time consuming and difficult to apply to large volumes of material. Also, depending on the wash solution, leaching or dissolution of the recovered material may occur. Thus, care must be taken in order to avoid possible complexation reactions between ions in solution, such as acetate, and ions in the solid, especially $Ba^{2+}$.

BRIEF SUMMARY OF THE INVENTION

The present invention provides a more efficient method of removing spectator ions and contaminants from an aqueous BTO suspension. In accordance with the method of the invention, the BTO particles are transported across a phase boundary into a non-polar organic solvent, leaving the spectator ions and contaminants in the aqueous phase. To facilitate the efficient transportation of the BTO across the phase boundary, the surface of the BTO particles is coated with an amphiphilic polyelectrolyte. The BTO can be recovered from the organic phase by evaporation. The dry BTO can be calcined to produce BT or can be redispersed in a polar solvent to produce BT using hydrothermal or glycolthermal techniques. The method of the present invention reduces the chlorine content of the BTO to as low as 80 ppm in one step.

The method of the present invention can be used to remove spectator ions and contaminants from aqueous suspensions of other solid particles. For example, the method can be used to remove chlorine ions from aqueous suspensions of aluminum hydroxide ($Al(OH)_3$).

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Aqueous suspensions of BTO particles can be produced by several techniques. The presently most preferred technique is described by R. A. Kimel, V. Ganine, and J. H. Adair, in "Double Injection Synthesis and Dispersion of Submicron Barium Titanyl Oxalate Tetrahydrate," *J. Am. Ceram. Soc.*, 84 [5] 1172-1174 (2001), which is hereby incorporated by reference in its entirety. In accordance with this technique, a first stream comprising a mixture of aqueous solutions of barium chloride and titanium chloride is injected into a rapid reaction chamber of a rapid reaction mixer to contact a second stream comprising an aqueous solution of oxalic acid. BTO precipitates from the mixed streams, which can be collected as an aqueous suspension of BTO. The aqueous suspension of BTO also comprises spectator ions and contaminants such as chlorine, excess barium and oxalic acid.

The double-injection technique can be used to produce BTO particles that have a geometric mean diameter ($D_{50}$) of from about 1 nm to about 10 μm or more and a monomodal particle size distribution. BTO particles having a $D_{50}$ of from about 1 nm to about 25 nm are preferred.

In accordance with the method of the invention, the BTO particles in the aqueous suspension are separated from the majority of the spectator ions and contaminants by forming an unstable emulsion between the aqueous BTO suspension and an immiscible, non-polar organic solvent and an amphiphilic polyelectrolyte. The formation of an unstable emulsion increases the contact between the aqueous phase and the non-polar organic phase, but allows for relatively rapid separation of the phases when the emulsion is permitted to stand.

The amphilic polyelectrolyte compound comprises a polar head portion and a non-polar tail portion. The polar head portion of the amphiphilic polyelectrolyte has an affinity for the surface of the BTO particles. It is believed that the polar head portion of a plurality of amphiphilic polyelectrolyte molecules become oriented with and associated with the surface of the BTO particles, leaving the non-polar tail portions of such molecules extended away from the surface of the BTO particle. This mono-layer of amphiphilic polyelectrolyte molecules disposed on the surface of the BTO particles creates a non-polar shell structure that allows the coated BTO particle to efficiently pass across the phase boundary from the aqueous phase into the non-polar organic phase. The amphiphilic polyelectrolyte, however, does not create a non-polar shell structure with the spectator ions and contaminants, which thus remain dissolved or suspended in the aqueous phase.

The non-polar organic phase comprising the amphiphilic polyelectrolyte coated BTO particles can be separated from the aqueous phase comprising the spectator ions and contaminants using a separation funnel or other conventional phase separation techniques. One iteration of the method of the invention typically reduces the chlorine content of the BTO to less than about 500 ppm, and more preferably less than about 300 ppm. It is possible to reduce the chlorine content of the BTO to as low as about 80 ppm in one iteration of the method.

The BTO particles can separated from the organic solvent simply by evaporating the organic solvent. Once the organic solvent is removed, the BTO particles can be calcined to obtain BT or redispersed in a polar solvent such as water or methanol for further processing.

The preferred amphiphilic polyclectrolyte compounds for use in the invention are organoamines such as, for example, octylamine and N,N-dimethyloctylamine (hereinafter sometimes referred to as "DMOA"). DMOA is presently most preferred for use in the invention because it binds less strongly to barium, which preserves the stoichiometric ratio between barium and titanium in the BTO. The amine head group in octylamine complexes with a $Ba^{2+}$ion in the same way as it complexes with a proton. In the case of DMOA, however, complexation with $Ba^{2+}$is hindered, if not completely prevented by the two methyl groups attached to the amine head while maintaining a similar charge and attraction to particle surfaces.

Preferred water-immiscible, non-polar organic solvents for use in the invention include toluene and octane. Both of these solvents have relatively high vapor pressures, which facilitates removal of the solvent by evaporative methods. Mixtures of toluene and methanol or ethanol can also be used.

The method of the present invention advantageously segregates the BTO particles from the aqueous phase. Thus, once segregated into the organic phase, there is no further opportunity for the BTO to dissolve in or decompose via aqueous reaction processes. The particle size of the precipitated BTO does not increase due to Ostwald ripening. For this reason, it is advantageous for the aqueous suspension of BTO particles to be emulsified with the non-polar organic solvent and amphiphilic polyelectrolyte compound very quickly after the BTO particles are formed. The BTO particles remain stable over time and at elevated temperature when dispersed in the organic phase.

The amount of the amphiphilic polyelectrolyte used in the process must be sufficient to facilitate the efficient transportation of the BTO particles across the phase boundary into the organic phase, but not so great as to create a bi-layer, which can make the coated BTO particles remain in the aqueous phase. Applicants have determined that efficient transportation of BTO particles from an aqueous phase to a toluene phase occurs when an octylamine concentration is greater than about 0.1% by weight of the BTO and less than 80% by weight of the BTO. The most efficient BTO transportation occurs from the aqueous phase into the organic toluene phase when the concentration of octylamine is in a range of from about 16% to about 36% by weight of the BTO. An acidic pH also appears to expedite the transfer of coated BTO particles across the phase boundary.

The method of the present invention can be used to remove spectator ions and contaminants from other precursor materials formed by wet chemical reactions. For example, the method can be used to remove chlorine from aqueous suspensions of aluminum hydroxide ($Al(OH)_3$) formed by contacting an aqueous sodium hydroxide solution with an aqueous aluminum chloride solution. The precipitated aluminum hydroxide particles can be coated with a suitable amphiphilic polyelectrolyte such as dioctyl sodium sulfosuccinate, which facilitates transportation of the coated aluminum hydroxide across a phase boundary into toluene or other water-immiscible non-polar organic solvent.

The following examples are intended only to illustrate the invention and should not be construed as imposing limitations upon the claims. Unless otherwise indicated, all examples were conducted at ambient temperature (~22.5° C.) and pressure (~1 atm). All of the reagents used in the examples can be obtained from Sigma Aldrich, Inc. (St. Louis, Mo.) and/or Fisher Scientific International, Inc. (Hanover Park, Ill.).

EXAMPLES

In Examples 1-14 below, BTO was produced using a double injection technique described by R. A. Kimel, V. Ganine, and J. H. Adair, in "Double Injection Synthesis and Dispersion of Submicron Barium Titanyl Oxalate Tetrahydrate," *J. Am. Ceram. Soc.*, 84 [5] 1172-1174 (2001). Unless otherwise stated, aqueous solutions of titanium tetrachloride (Alfa Aesar, Ward Hill, Mass.), barium chloride (Alfa Aesar, Ward Hill, Mass.), and oxalic acid (Alfa Aesar, Ward Hill, Mass.) were prepared in standard Pyrex volumetric flasks using deionized water to provide titanium to barium to oxalic acid molar ratios of 1.0 to 1.05 to 2.2. To keep titanium ions from hydrolyzing, the aqueous titanium tetrachloride+barium chloride solution was cooled to about 7° C. before being reacted. To prevent the oxalic acid from precipitating, the aqueous oxalic acid solution was heated to about 80° C. before being reacted. The aqueous reactant solutions were placed in their respective chambers in the double injection apparatus and were pressurized with nitrogen gas to 30 psi and injected into the mixing chamber at a controlled flow rate. In the mixing chamber, the reactant solutions were combined under high shear, producing an aqueous suspension of precipitated BTO. The aqueous suspension of BTO was delivered into glass-stoppered, Pyrex flasks containing the water-immiscible non-polar organic solvent the amphiphilic polyelectrolyte. The flasks were then sealed and shaken vigorously by hand for 1 minute to allow mixing of aqueous and non-aqueous phases. The mixtures were left to separate overnight, although separation usually began within 5-10 minutes after agitation.

BTO solids were recovered by filtration through a 0.22 μm mixed cellulose ester membrane (Millipore, Bedford, Mass.). Some samples of aqueous phase and collected solids were analyzed by directly-coupled plasma mass spectroscopy (Spectraspan III dc Plasma Emission Spectrometer, Spectrametrics, Inc., Andover, Mass.) to determine the concentrations of $Ba^{2+}$, $Ti^{4+}$, and $Cl^-$ present. Some samples of wet interface phase were also examined with an optical microscope (Leica, Buffalo, N.Y.). Some samples of dried solid were examined using a scanning electron microscope (Hitachi S-3000H Scanning Electron Microscope, Hitachi Scientific Instruments, San Jose, Calif.) in secondary electron mode.

Example 1

An aqueous stock solution of 0.2M HCl and 0.02M octylamine was prepared by adding 4.5 mL concentrated HCl and 4.16 mL of octylamine (in that order) to 250 mL de-ionized water. Six mixtures of 1 mL de-ionized water and 10 mL toluene were prepared in Pyrex test tubes. Volumes of 0.0 mL, 0.155 mL, 0.465 mL, 0.620 mL, and 0.775 mL stock octylamine solution were added to five test tubes. A mass of 0.0034 g polyethyleneimine was added to the sixth test tube. All six mixtures were shaken for 1 minute by hand and left to separate. Stable emulsions did not form.

Example 2

Aqueous solutions of 1.1 M oxalic acid (heated to 85° C.), 1.05 M barium chloride (kept at room temperature), and 1.0 M titanium tetrachloride (cooled to 4° C.) were prepared. A 1 L suspension of 1.0 M barium titanyl oxalate tetrahydrate was precipitated by mixing 250 mL barium chloride solution and 250 mL titanium tetrachloride solution with 500 mL oxalic acid solution using the double-injection mixing technique previously described above. Volumes of 100 mL precipitated BTO suspension were added to six mixtures of 10 mL de-ionized water and 100 mL toluene containing 0.0 mL, 1.55 mL, 4.65 mL, 6.20 mL, 7.75 mL octylamine stock solution from Example 1, and 0.207 g polyethyleneimine, respectively, in Pyrex beakers. These mixtures were shaken for 1 minute by hand and left to separate. After 10 minutes, each mixture prepared with octylamine had separated into a cloudy toluene phase and an aqueous phase with settled particles. The mixture prepared with PEI had separated into a clear toluene phase and a cloudy aqueous phase. The toluene phases of the mixtures containing 4.65 mL and 7.75 mL octylamine stock solution were light yellow in color.

Example 3

Aqueous solutions of 0.11 M oxalic acid (heated to 85° C.), 0.105 M barium chloride (kept at room temperature), and 0.1 M titanium tetrachloride (cooled to 4° C.) were prepared. A stock solution of 1 part octylamine, 1 part concentrated HCl, and 2 parts de-ionized water (by volume) was prepared. A 1 L suspension of 0.1 M barium titanyl oxalate tetrahydrate was precipitated by mixing 250 mL barium chloride solution and 250 mL titanium tetrachloride solution with 500 mL oxalic acid solution using a double-injection mixing technique.

Volumes of 100 mL precipitated BTO suspension were added to six Pyrex beakers containing 120 mL toluene with 0.5 g polyethyleneimine, 0.5 mL octylamine, 0.4 mL, 1.0 mL, 2.0 mL, and 4.0 mL octylamine stock solution, respectively. These mixtures were shaken for 1 minute by hand and left to separate.

After 30 minutes, the mixture containing 0.5 g polyethyleneimine had separated into a clear toluene phase and an aqueous phase containing settled particles. The mixtures containing 0.5 mL octylamine, 0.4 mL, 1.0 mL, 2.0 mL, and 4.0 mL octylamine stock solution had separated into a cloudy white toluene phase and a clear aqueous phase with no settled particles.

Example 4

Aqueous solutions of 0.11 M oxalic acid (heated to 85° C.), 0.105 M barium chloride (kept at room temperature), and 0.1 M titanium tetrachloride (cooled to 4° C.) were prepared. A stock solution of 1 part polyethyleneimine, 1 part concentrated HCl, and 2 parts de-ionized water (by weight) was prepared. A 1 L suspension of 0.1 M barium titanyl oxalate tetrahydrate was precipitated by mixing 250 mL barium chloride solution and 250 mL titanium tetrachloride solution with 500 mL oxalic acid solution using a double-injection mixing technique.

Two samples of as-precipitated BTO suspension were collected in Pyrex beakers, and their particle size was measured by light scattering (Leeds & Northrup Microtrac UPA 150, Austin, Tex.). The as-precipitated suspensions had particle sizes between 1 and 3 μm. Masses of 2.0 g polyethyleneimine stock solution and 3.0 g polyethyleneimine were added to two samples of 100 mL precipitated BTO suspension in Pyrex beakers. Primary particle size measured by light scattering of the suspension containing 2.0 g stock solution was approximately 35 nm with 1-2 μm agglomerates. The sample containing 3.0 g polyethyleneimine was not turbid enough for an accurate measurement.

Volumes of 100 mL precipitated BTO suspension were added to two Pyrex beakers containing 120 mL toluene with 2.0 mL and 3.0 mL polyethyleneimine stock solution, respectively. The mixtures were shaken for 1 minute by hand and left to separate. Within 5 minutes, the mixture containing 2.0 mL stock solution had separated into a clear toluene phase and cloudy aqueous phase without any settled particles. Within 5 minutes, the mixture containing 3.0 mL stock solution had separated into a clear toluene phase and a clear aqueous phase without any visible sign of particles.

Example 5

Aqueous solutions of 0.11 M oxalic acid (heated to 100° C.), 0.105 M barium chloride (kept at room temperature), and 0.1 M titanium tetrachloride (cooled to 4° C.) were prepared. A stock solution of 1 part octylamine, 1 part concentrated HCl, and 2 parts de-ionized water (by volume) was prepared (hereafter referred to as Oct-1). A stock solution of 1 part octylamine, 2 parts concentrated HCl, and 1 part de-ionized water (by volume) was prepared (hereafter referred to as Oct-2). A 1 L suspension of 0.1 M barium titanyl oxalate tetrahydrate was precipitated by mixing 250 mL barium chloride solution and 250 mL titanium tetrachloride solution with 500 mL oxalic acid solution using a double-injection mixing technique.

Volumes of 110 mL precipitated BTO suspension were added to four Pyrex beakers containing 120 mL toluene with 0.9 mL, 1.2 mL, 1.6 mL, and 2.0 mL Oct-1 stock solution, respectively. Volumes of 110 mL precipitated BTO suspension were added to four Pyrex beakers containing 120 mL toluene with 0.9 mL, 1.2 mL, 1.6 mL, and 2.0 mL Oct-2 stock solution, respectively. These mixtures were shaken for 1 minute by hand and left to separate. After 1 hour, each mixture had separated into a cloudy toluene phase and a clear aqueous phase with no settled particles. Mixtures containing 2.0 mL Oct-1 and 1.6 mL Oct-2 showed the most efficient separation.

Elemental analysis of recovered solids with direct current mass spectroscopy (DCP-MS) showed that as-recovered powders prepared with 0.9, 1.2, 1.6, and 2.0 mL Oct-1 stock solution contained 0.2, <0.05, <0.05, and <0.05 ppm chlorine, respectively. Similar analysis showed that as-recovered powders prepared with 0.9, 1.2, 1.6, and 2.0 mL Oct-2 stock solution contained 0.1, <0.05, <0.05, and <0.05 ppm chlorine, respectively.

Samples of recovered solid were calcined to 1200° C.; samples prepared with Oct-1 stock solution contained 18, <1, <1, and 5 ppm chlorine, respectively. Samples prepared with Oct-2 solution contained 2, <1, 2, and 5 ppm chlorine, respectively.

Aqueous supernatant of solid prepared with 1.6 mL Oct-2 stock solution was analyzed for $Ba^{2+}$ and $Ti^{4+}$ content. A mass balance calculation with the results showed that the recovered solid had a Ba/Ti ratio of 0.79.

Example 6

Aqueous solutions of 0.11 M oxalic acid (heated to 100° C.), 0.105 M barium chloride (kept at room temperature), and 0.1 M titanium tetrachloride (cooled to 4° C.) were prepared. A stock solution of 1 part octylamine, 2 parts concentrated HCl, and 1 part de-ionized water (by volume) was prepared (hereafter referred to as Oct-2). A 1 L suspension of 0.1 M barium titanyl oxalate tetrahydrate was precipitated by mixing 250 mL barium chloride solution and 250 mL titanium tetrachloride solution with 500 mL oxalic acid solution using a double-injection mixing technique.

Volumes of 80 mL precipitated BTO suspension were added to five Pyrex beakers containing 80 mL octane with 0.55 mL, 0.8 mL, 1.1 mL, 1.35 mL, and 2.7 mL Oct-2 stock solution, respectively. These mixtures were shaken for 1 minute by hand and left to separate. After 5 minutes, the mixture containing 0.55 mL Oct-2 stock solution had separated into a clear octane phase and a cloudy aqueous phase. The mixtures containing 0.8 mL and 1.1 mL Oct-2 stock solution had separated into a cloudy octane phase and a cloudy aqueous phase with settled particles. The mixtures containing 1.35 mL and 2.7 mL Oct-2 stock solution had separated into a cloudy octane phase and a clear aqueous phase with no settled particles.

Elemental analysis of recovered solids with direct current mass spectroscopy (DCP-MS) showed that as-recovered powders prepared with 0.55, 0.8, 1.35, and 2.7 mL Oct-2 stock solution contained 2.2, 0.4, 0.3, and 0.2 ppm chlorine, respectively. Samples of recovered solid were also calcined to 1200° C. and found to contain 16, 21, 27, and 29 ppm chlorine, respectively.

Aqueous supernatant of solid prepared with 2.7 mL Oct-2 stock solution was analyzed for $Ba^{2+}$ and $Ti^{4+}$ content. A mass balance calculation with the results showed that the recovered solid had a Ba/Ti ratio of 0.45.

Example 7

Aqueous solutions of 0.11 M oxalic acid (heated to 80° C.), 0.105 M barium chloride (kept at room temperature), and 0.1 M titanium tetrachloride (cooled to 4° C.) were prepared. A 500 mL suspension of 0.1 M barium titanyl oxalate tetrahydrate was precipitated by mixing 125 mL barium chloride solution and 125 mL titanium tetrachloride solution with 250 mL oxalic acid solution using a double-injection mixing technique. The entire precipitated BTO suspension was stirred for 1 hour at 85° C. for 1 hour, cooled to 35° C., then added to a Pyrex beaker containing 500 mL toluene and 1.70 mL polyoxyethylene(5)nonylphenyl ether (30 w/w based on solids loading). The mixture was shaken for 1 minute by hand and left to separate. Immediately, the mixture began to phase separate into a slightly cloudy top phase and an opaque white bottom phase. After settling overnight, the toluene phase had become clear and a discrete interface was visible between phases.

Example 8

Aqueous solutions of 0.11 M oxalic acid (heated to 80° C.), 0.105 M barium chloride (kept at room temperature), and 0.1 M titanium tetrachloride (cooled to 4° C.) were prepared. A 500 mL suspension of 0.1 M barium titanyl oxalate tetrahydrate was precipitated by mixing 125 mL barium chloride solution and 125 mL titanium tetrachloride solution with 250 mL oxalic acid solution using a double-injection mixing technique. The entire precipitated BTO suspension was added to a Pyrex beaker containing 500 mL toluene and 1.88 mL oleic acid (30 w/w based on solids loading). The mixture was shaken for 1 minute by hand and left to separate. Immediately, the mixture began to phase separate into a slightly cloudy top phase and an opaque white bottom phase. After 1.5 hours, the mixture was separated into equal volumes of a slightly cloudy top phase and a clear bottom phase with settled particles at the bottom of the collection vessel.

Example 9

Aqueous solutions of 0.11 M oxalic acid (heated to 80° C.), 0.105 M barium chloride (kept at room temperature), and 0.1 M titanium tetrachloride (cooled to 4° C.) were prepared. A 500 mL suspension of 0.1 M barium titanyl oxalate tetrahydrate was precipitated by mixing 125 mL barium chloride solution and 125 mL titanium tetrachloride solution with 250 mL oxalic acid solution using a double-injection mixing technique. The entire precipitated BTO suspension was added to a Pyrex beaker containing 500 mL toluene and 2.2 mL N,N-dimethyloctylamine (30 w/w based on solids loading). The mixture was shaken for 1 minute by hand and left to separate.

After shaking, the mixture was opaque white. After 5 minutes, a clear aqueous phase had begun to form at the bottom of the collection vessel. After 2 hours, the mixture had separated into a cloudy, translucent top phase, a clear bottom phase with opaque white bubbles at the bottom, and an opaque white interface between phases. XRD analysis of solids recovered from both phases showed that the material was crystalline BTO. Mass spectrometry analysis showed that the Ba:Ti ratio of solid dried from the toluene phase was ~1.0 (supernatant mass balance) with a chlorine content of ~1.0 w/w (10,000 ppm).

Example 10

Aqueous solutions of 0.11 M oxalic acid (heated to 80° C.), 0.105 M barium chloride (kept at room temperature), and 0.1 M titanium tetrachloride (cooled to 4° C.) were prepared. A stock solution of 1 part N,N-dimethyloctylamine, 2 parts concentrated HCl, and 1 part de-ionized water (by volume) was prepared. A 500 mL suspension of 0.1 M barium titanyl oxalate tetrahydrate was precipitated by mixing 125 mL barium chloride solution and 125 mL titanium tetrachloride solution with 250 mL oxalic acid solution using a double-injection mixing technique. The entire precipitated BTO suspension was added to a Pyrex beaker containing 500 mL toluene and 5.87 mL dimethyloctylamine stock solution (20 w/w, based on solids loading). The mixture was shaken for 1 minute by hand and left to separate.

After 10 minutes, the mixture had separated into a clear aqueous phase, comprising about 30% of the total volume, and an opaque white top phase, which made up the remaining 70%. After 2 hours, the mixture had separated into 50% opaque top phase and 50% clear bottom phase. Opaque white bubbles, approximately 1 mm in diameter, were visible on the bottom of the collection vessel. After 15 hours, the top phase had settled into a clear supernatant with opaque white bubbles floating at the interface between the two phases. X-ray diffraction (Scintag, Inc.) confirmed that solid filtered from the top phase was crystalline BTO. Mass spectroscopy analysis showed that the Ba:Ti ratio of this solid was ~1.0 (supernatant mass balance) with a chlorine content of 110 ppm. XRF analysis showed this solid to have a Ba:Ti ratio of 0.98. Repetition of this procedure yielded similar results.

Example 11

Aqueous solutions of 0.11 M oxalic acid (heated to 80° C.), 0.105 M barium chloride (kept at room temperature), and 0.1 M titanium tetrachloride (cooled to 4° C.) were prepared. A stock solution of 1 part N,N-dimethyloctylamine, 2 parts concentrated HCl, and 1 part de-ionized water (by volume) was prepared. A 500 mL suspension of 0.1 M barium titanyl oxalate tetrahydrate was precipitated by mixing 125 mL barium chloride solution and 125 mL titanium tetrachloride solution with 250 mL oxalic acid solution using a double-injection mixing technique. The entire precipitated BTO suspension was added to a Pyrex beaker containing 500 mL toluene and 0.587 mL dimethyloctylamine stock solution (2 w/w, based on solids loading). The mixture was shaken for 1 minute by hand and left to separate.

After 3 minutes, the mixture had separated into a clear aqueous phase, comprising 25% of the total volume, and an opaque white toluene phase, which made up the remaining 75%. After settling overnight, the mixture was separated into 50% cloudy toluene phase and 50% cloudy aqueous phase with sediment at the bottom of the collection vessel and centimeter-scale bubbles at the discrete liquid-liquid interface. No solid was recovered from the top phase. Solid filtered from the bottom phase was identified as crystalline BTO by x-ray diffraction (Scintag, Inc.). Mass spectroscopy analysis showed that the Ba:Ti ratio of this solid was between 0.90 (analysis of digested solid) and 1.5 (supernatant mass balance) with a chlorine content of 300 ppm.

Example 12

Aqueous solutions of 0.11 M oxalic acid (heated to 80° C.), 0.105 M barium chloride (kept at room temperature), and 0.1 M titanium tetrachloride (cooled to 4° C.) were prepared. A stock solution of 1 part polyethyleneimine and 2 parts de-ionized water (by volume), adjusted to pH 3 with HCl, was prepared. A 500 mL suspension of 0.1 M barium titanyl oxalate tetrahydrate was precipitated by mixing 125 mL barium chloride solution and 125 mL titanium tetrachloride solution with 250 mL oxalic acid solution using a double-injection mixing technique. The precipitated suspension was collected in a Pyrex beaker containing 1.3 mL PEI stock solution (8 w/w, based on solids loading), heated to 80° C. and stirred for 1 hour. After cooling to 50° C., the suspension was added to another Pyrex beaker containing 500 mL toluene and 1.68 g stearic acid (30 w/w, based on solids loading). The mixture was shaken for 1 minute by hand and left to separate.

After about 1 minute, the mixture had separated into a clear toluene phase and a cloudy aqueous phase with a discrete interface between them. The pH of the aqueous phase was adjusted from 1.4 to 4.6 with tetraethylammonium hydroxide and both phases were again mixed and shaken for 1 minute. The mixture again separated into a clear toluene phase and a cloudy aqueous phase with a discrete interface between them. Solid was recovered by centrifugation of the aqueous phase. Mass spectroscopy analysis showed that the Ba:Ti ratio of this solid was between 0.60 (analysis of digested solid) and 1.08 (supernatant mass balance) with a chlorine content of ~10,000 ppm.

Example 13

Aqueous solutions of 0.11 M oxalic acid (heated to 80° C.), 0.105 M barium chloride (kept at room temperature), and 0.1 M titanium tetrachloride (cooled to 4° C.) were prepared. A stock solution of 1 part polyethyleneimine and 2 parts de-ionized water (by volume), adjusted to pH 3 with HCl, was prepared. A 500 mL suspension of 0.1 M barium titanyl oxalate tetrahydrate was precipitated by mixing 125 mL barium chloride solution and 125 mL titanium tetrachloride solution with 250 mL oxalic acid solution using a double-injection mixing technique. The precipitated suspension was collected in a Pyrex beaker containing 1.3 mL PEI stock solution (8 w/w, based on solids loading), heated to 80° C. and stirred for 1 hour. After cooling to 50° C., the suspension was added to another Pyrex beaker containing 500 mL toluene and 1.89 mL oleic acid (30 w/w, based on solids loading). The mixture was shaken for 1 minute by hand and left to separate.

After about 1 minute, the mixture had separated into a clear toluene phase and a cloudy aqueous phase with a discrete interface between them. The pH of the aqueous phase was adjusted from 1.1 to 4.0 with tetraethylammonium hydroxide and both phases were again mixed and shaken for 1 minute. The mixture again separated into a clear toluene phase and a cloudy aqueous phase with a discrete interface between them. Solid was recovered by centrifugation of the aqueous phase. Mass spectroscopy analysis showed that the Ba:Ti ratio of this solid was between 0.75 (analysis of digested solid) and 1.06 (supernatant mass balance) with a chlorine content of ~10,000 ppm.

Example 14

Aqueous solutions of 0.11 M oxalic acid (heated to 80° C.), 0.105 M barium chloride (kept at room temperature), and 0.1 M titanium tetrachloride (cooled to 4° C.) were prepared. A stock solution of 1 part N,N-dimethyloctylamine, 2 parts concentrated HCl, and 1 part de-ionized water (by volume) was prepared. A 500 mL suspension of 0.1 M barium titanyl oxalate tetrahydrate was precipitated by mixing 125 mL barium chloride solution and 125 mL titanium tetrachloride solution with 250 mL oxalic acid solution using a double-injection mixing technique. The entire precipitated BTO suspension was added to a Pyrex beaker containing 500 mL toluene and 2.94 mL N,N-dimethyloctylamine stock solution (10 w/w, based on solids loading). The mixture was shaken for 1 minute by hand and left to separate.

After 5 minutes, the mixture had separated into a clear aqueous phase and an opaque white toluene phase. After settling overnight, the mixture was separated into a clear toluene phase, a clear aqueous phase, and an opaque white interface phase of millimeter-scale bubbles. Each phase was filtered with a 0.22 μm Teflon filter. The recovered solid was identified as crystalline BTO by x-ray diffraction (Scintag, Inc.). Mass spectroscopy analysis showed that the Ba:Ti ratio of this solid was between 0.87 (analysis of digested solid) and 1.08 (supernatant mass balance) with a chlorine content of 80 ppm.

Example 15

Aqueous solutions of 0.1 M aluminum chloride and 1.0 M sodium hydroxide were prepared. A 235 mL suspension of aluminum hydroxide was precipitated by titrating 200 mL aluminum chloride solution with 35 mL sodium hydroxide solution to a pH of 3.74 with an automatic titrator (Dispersion Technologies, Inc., Mount Kisco, N.Y.). The precipitated suspension was added to a Pyrex beaker containing 200 mL toluene and 0.6 mL octylamine (30 w/w based on solids loading). The mixture was shaken for 15 seconds by hand and left to separate. After 1 minute, the mixture had phase separated into a clear top phase and an opaque white bottom phase.

Example 16

Aqueous solutions of 0.1 M aluminum chloride and 1.0 M sodium hydroxide were prepared. A 235 mL suspension of aluminum hydroxide was precipitated by titrating 200 mL aluminum chloride solution with 35 mL sodium hydroxide solution to a pH of 3.48 with an automatic titrator (Dispersion Technologies, Inc., Mount Kisco, N.Y.). The precipitated suspension was added to a Pyrex beaker containing 200 mL toluene and 0.63 mL dioctyl sodium sulfosuccinate (30 w/w based on solids loading). The mixture was shaken for 1 minute by hand and left to separate.

After 15 minutes, the mixture had separated into a cloudy top phase and an opaque white bottom phase. After 22 hours, the mixture had further separated into a cloudy top phase, a clear bottom phase, and an opaque interface of small bubbles between them. A discrete liquid interface was not visible.

Example 17

Aqueous solutions of 0.1 M aluminum chloride and 1.0 M sodium hydroxide were prepared. A 470 mL suspension of aluminum hydroxide was precipitated by titrating 400 mL aluminum chloride solution with 70 mL sodium hydroxide solution to a pH of 3.91 with an automatic titrator (Dispersion Technologies, Inc., Mount Kisco, N.Y.). The precipitated suspension was added to a Pyrex beaker containing 400 mL toluene and 1.25 mL dioctyl sodium sulfosuccinate (30 w/w based on solids loading). The mixture was shaken for 1 minute by hand and left to separate.

After 19 hours, the mixture had phase separated into a cloudy top phase and an opaque white bottom phase. After 7 days, the mixture had separated into a cloudy top phase, a clear bottom phase, and an opaque interface of small bubbles between them. A discrete liquid interface was not visible. X-ray diffraction analysis (Scintag, Inc.) of solid dried from the toluene phase showed an amorphous material. X-ray diffraction analysis of solid dried from the interface phase showed a weak sodium chloride pattern.

Example 18

Aqueous solutions of 1.0 M aluminum chloride and 5.0 M sodium hydroxide were prepared. A 600 mL suspension of aluminum hydroxide was precipitated by titrating 400 mL aluminum chloride solution to a pH of 3.7 with the dropwise addition of 200 mL sodium hydroxide solution. The precipitated suspension was added to a Pyrex beaker containing 400 mL toluene and 12.5 mL dioctyl sodium sulfosuccinate (30 w/w based on solids loading). The mixture was shaken for 1 minute by hand and left to separate.

After 19 hours, the mixture had separated into a cloudy top phase (30% of total volume) and an opaque white-bottom phase with visible sedimentation (70% of total volume). X-ray diffraction analysis (Scintag, Inc.,) of solid dried from the top phase showed a weak sodium chloride pattern. X-ray diffraction analysis of solid dried from the opaque bottom phase showed a strong sodium chloride pattern.

Using a 1 L Pyrex separatory funnel, the top and bottom phases were separated. The bottom phase was collected in a Pyrex beaker and 250 mL clean toluene was added to it. The mixture was shaken for 1 minute by hand and left to separate. Within 5 minutes, the mixture had separated into a clear bottom phase (30% of total volume) and an opaque white top phase (70% of total volume). The bottom phase was removed and replaced with toluene.

Over the next 45 days, the mixture continued separating into a clear bottom phase, a cloudy top phase, and an opaque white interface of bubbles between them. A total of 467 mL clear bottom phase was removed.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method for removing spectator ions from an aqueous barium titanyl oxalate suspension comprising:
   contacting an aqueous suspension comprising barium titanyl oxalate particles and spectator ions with a water immiscible non-polar organic solvent and an amphiphilic polyelectrolyte under conditions suitable to form an unstable emulsion;
   allowing the unstable emulsion to phase separate into an aqueous phase and an organic phase, wherein the organic phase comprises amphiphilic polyelectrolyte coated barium titanyl oxalate particles and less than about 500 ppm of the spectator ions by weight of the barium titanyl oxalate particles; and separating the aqueous phase from the organic phase.

2. The method according to claim 1 wherein the amphiphilic polyelectrolyte is an organoamine compound selected from the group consisting of octylamine and N,N-dimethyloctylamine.

3. The method according to claim 1 wherein the organic solvent is selected from the group consisting of toluene and octane.

4. The method according to claim 1 wherein the amount of amphiphilic polyelectrolyte is greater than 0.1% and less than 80% by weight of the barium titanyl oxalate particles.

5. The method according to claim 1 further comprising evaporating the organic solvent from the separated organic phase to obtain amphiphilic polyelectrolyte-coated barium titanyl oxalate particles.

6. The method according to claim 1 wherein the aqueous suspension comprising barium titanyl oxalate particles and spectator ions is formed by injecting a first stream comprising an aqueous mixture of barium chloride and titanium chloride into a rapid mixing chamber of a rapid mixing reactor into contact with a second stream comprising an aqueous solution of oxalic acid.

7. The method according to claim 1 wherein the barium titanyl oxalate particles have a geometric mean diameter within the range of from about 1 to about 25 nm.

8. The method according to claim 1 wherein the spectator ions comprise chlorine ions.

9. A method for removing spectator ions from an aqueous suspension of solid particles comprising:

contacting an aqueous suspension comprising solid particles and dissolved spectator ions with a water immiscible non-polar organic solvent and an amphiphilic polyelectrolyte under conditions suitable to form an unstable emulsion;

allowing the unstable emulsion to phase separate into an aqueous phase and an organic phase, wherein the organic phase comprises amphiphilic polyelectrolyte coated solid particles and less than about 500 ppm of the dissolved spectator ions by weight of the solid particles; and separating the aqueous phase from the organic phase.

10. The method according to claim 9 wherein the solid particles comprise aluminum hydroxide.

11. The method according to claim 1, wherein the amphiphilic polyelectrolyte comprises octylamine, wherein the amount of amphiphilic polyelectrolyte is about 16% to about 36% by weight of the barium titanyl oxalate particles, and wherein the organic solvent comprises toluene.

* * * * *